(12) United States Patent
Spoto et al.

(10) Patent No.: US 11,784,973 B2
(45) Date of Patent: Oct. 10, 2023

(54) EDGE-BASED ENTERPRISE NETWORK SECURITY APPLIANCE AND SYSTEM

(71) Applicant: Duskrise Inc., Wilmington, DE (US)

(72) Inventors: Emanuele Spoto, Rome (IT);
Emanuele De Lucia, Rome (IT);
Antonio Farina, Rome (IT)

(73) Assignee: Duskrise Inc., Wilmington, DE (US)

( * ) Notice: Subject to any disclaimer, the term of this patent is extended or adjusted under 35 U.S.C. 154(b) by 0 days.

(21) Appl. No.: 17/870,635

(22) Filed: Jul. 21, 2022

(65) Prior Publication Data
US 2023/0054201 A1  Feb. 23, 2023

Related U.S. Application Data

(60) Provisional application No. 63/233,899, filed on Aug. 17, 2021.

(51) Int. Cl.
*H04L 29/06* (2006.01)
*H04L 9/40* (2022.01)
*H04W 12/00* (2021.01)

(52) U.S. Cl.
CPC ...... *H04L 63/0236* (2013.01); *H04L 63/0272* (2013.01); *H04W 12/009* (2019.01)

(58) Field of Classification Search
CPC .......... H04L 63/0236; H04L 63/0272; H04W 12/009
See application file for complete search history.

(56) References Cited

U.S. PATENT DOCUMENTS

| | | | |
|---|---|---|---|
| 9,143,480 B2 | 9/2015 | Brousseau et al. | |
| 10,348,767 B1* | 7/2019 | Lee | H04L 63/0236 |
| 10,382,401 B1* | 8/2019 | Lee | H04L 63/166 |
| 2003/0041136 A1 | 2/2003 | Cheline et al. | |
| 2003/0217126 A1 | 11/2003 | Polcha et al. | |
| 2008/0043640 A1 | 2/2008 | Smith et al. | |
| 2017/0272256 A1* | 9/2017 | Yang | H04L 63/0823 |
| 2019/0238592 A1* | 8/2019 | Qureshi | G06F 21/53 |
| 2020/0127881 A1* | 4/2020 | Kempe | H04L 67/1008 |

OTHER PUBLICATIONS

International Search Report and Written Opinion dated Oct. 4, 2022, PCT/US2022/037920, 15 pages.

* cited by examiner

*Primary Examiner* — Wasika Nipa
(74) *Attorney, Agent, or Firm* — Brownstein Hyatt Farber Schreck, LLP

(57) ABSTRACT

An enterprise-grade network security system is described herein. An enterprise-grade network security system may ensure that a consumer-managed network conforms with security standards for a company. In this manner, potential cyber threats may be prevented from infecting centralized company resources. An enterprise-grade network security system may include hardware, software, applications, and a strategic intelligence platform utilizing machine learning and artificial intelligence to identify potential security risks.

17 Claims, 9 Drawing Sheets

EDGE-BASED ENTERPRISE NETWORK SECURITY APPLIANCE AND SYSTEM

CROSS-REFERENCE TO RELATED APPLICATION(S)

This application is a nonprovisional of, and claims the benefit under 35 U.S.C. § 119 of, U.S. Provisional Patent Application No. 63/233,899 filed on Aug. 17, 2021, and entitled "Systems and Methods for Providing Network Security," the contents of which are incorporated by reference in their entirety.

TECHNICAL FIELD

Embodiments described herein relate to systems and methods for maintaining enterprise-grade network security for work-from-home employees of an organization. In particular, embodiments relate to automatically self-configuring enterprise-grade network security appliances, and methods for operating the same, ensuring that consumer-managed networks, and devices connected to consumer-managed networks, maintain compliance with an organization's security policies.

BACKGROUND

Many organizations offer a form of remote working capability for some or all employees. Conventionally, a remote-work employee typically uses a personally-managed internet connection (e.g., home internet) along with a personal device or company-provided device, such as a laptop computer, to access company resources.

In many circumstances, however, employees exhibit different information and device security behaviors (and awareness) when working from home. These behaviors may inadvertently create one or more exploitable vectors for a malicious actor to access company resources.

SUMMARY

Embodiments described herein take the form of a portable electronic device for installation within a private computer network managed by a remote employee of an organization, the portable electronic device including at least a housing enclosing a first communication subsystem, a second communication subsystem, a memory resource storing an executable asset, and a processing resource operably coupled to the memory resource and configured to load from the memory resource the executable asset to instantiate an instance of an edge application.

In these example embodiments, the edge application may be configured to access from the memory a unique identifier associated with at least one of the organization or the employee, access from the memory an address pointing to a backend application instance associated with the organization, submit (via the first communication subsystem over the private computer network) a request to the backend application via the address, the request including the unique identifier. In response to the request, the edge application may receive, via the first communication subsystem over the private computer network, from the backend application, a response with configuration information.

With the configuration information, the edge application may automatically configure at least one operational parameter of the second communication subsystem and automatically communicably couple the first communication subsystem to a virtual private network of the organization based on the configuration information such that traffic generated by a client device coupled to the second communication subsystem may be directed through the virtual private network over the private computer network, and enable the second communication subsystem.

Additional embodiments described herein take the form of an electronic device for installation within a private computer network managed by a remote employee of an organization. The electronic device may include at least a wireless communication subsystem, a network interface card, a memory resource, and a processing resource. The processing resource may be operably coupled to the memory resource and may be configured to cooperate with the memory resource to instantiate an instance of an edge application.

As with other described embodiments, the edge application may be configured to advertise a first wireless network with the wireless communication subsystem, communicably couple to a first client device via the first wireless network, serve a web page to the first client device via the first wireless network, receive from the first client device a credential as input to the web page, access from the memory an address pointing to a backend application instance associated with the organization, submit, via the network interface card over the private computer network, a request to the backend application via the address, the request with the credential, receive (via the network interface card over the private computer network, from the backend application in response to the request) a response with configuration information.

With the received configuration information, the edge application may be configured to automatically modify, configure, or otherwise adjust an operational parameter of a second wireless network advertised by the wireless communication subsystem based on the configuration information, automatically communicably couple to a private domain name service of the organization based on the configuration information, and automatically communicably couple to a virtual private network of the organization based on the configuration information such that traffic from a second client device communicably coupled to the second wireless network may be directed through the virtual private network over the private computer network.

Some embodiments described herein take the form of an electronic device for coupling to a private computer network managed by a remote employee of an organization. The portable electronic device can include at least a communication subsystem, a memory resource, and a processing resource operably coupled to the memory resource and cooperate with the memory resource to instantiate an instance of an edge application. The edge application may be configured to access from the memory an address pointing to a backend application instance associated with the organization, submit (via the network interface card over the private computer network) a request for configuration information to the backend application via the address and may receive (via the communication subsystem over the private computer network) from the backend application in response to the request, a response with the configuration information. With the configuration information, the edge application may be configured to automatically configure an operational parameter the communication subsystem based on the configuration information to define a secure network and additionally automatically communicably couple to a virtual private network of the organization based on the configuration information such that all traffic from a client device communicably coupled to the secure network defined by the communication subsystem may be directed through the virtual private network over the private computer network.

BRIEF DESCRIPTION OF THE DRAWINGS

Reference will now be made to representative embodiments illustrated in the accompanying figures. It should be understood that the following descriptions are not intended to limit the embodiments to one or more preferred embodiments. To the contrary, they are intended to cover alternatives, modifications, and equivalents as may be included within the spirit and scope of the described embodiments as defined by the appended claims.

The use of the same or similar reference numerals in different figures indicates similar, related, or identical items.

Figure 1:
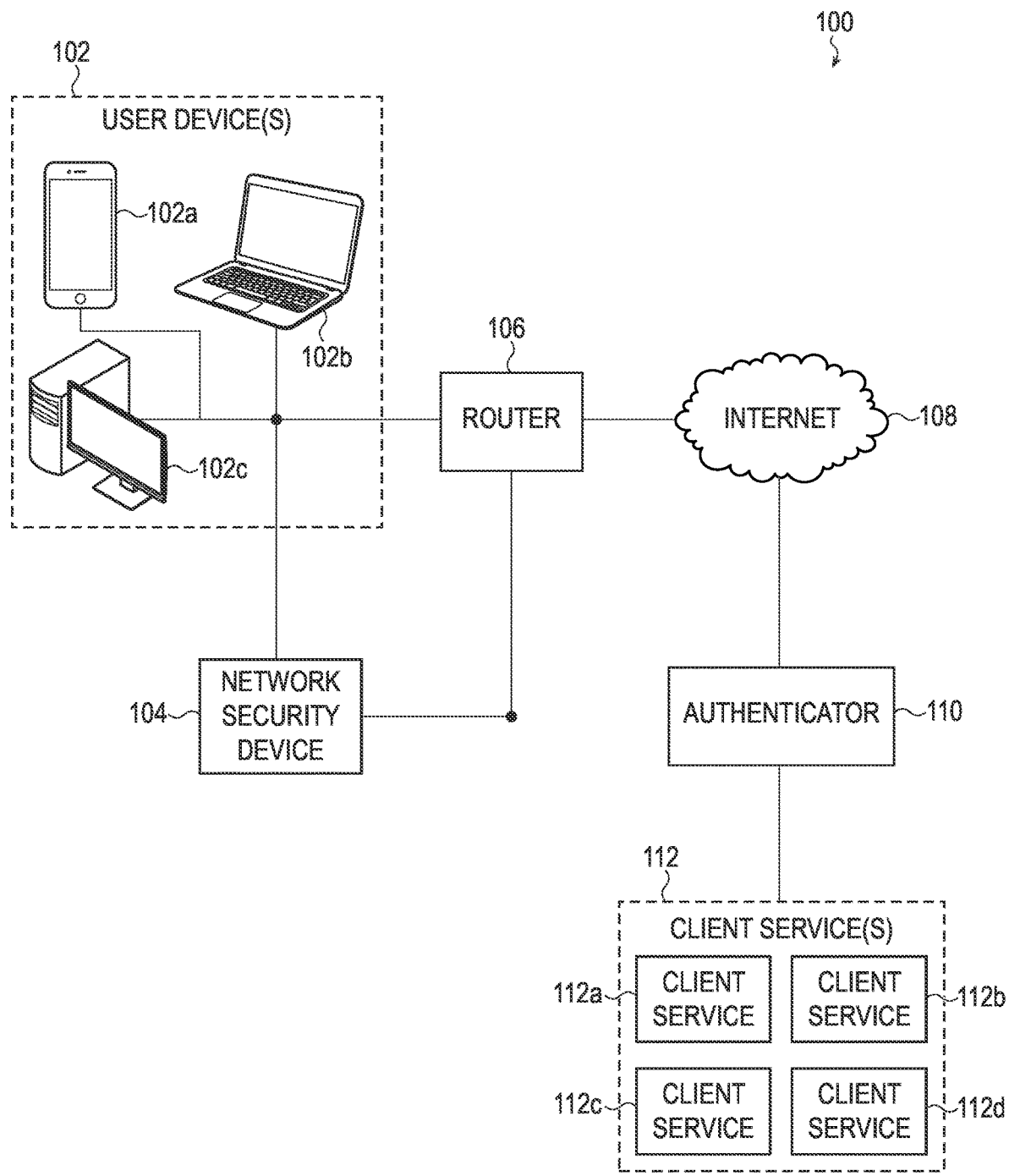
FIG. 1 depicts an example remote access system including an edge-based enterprise network security device for providing enterprise-grade network security, as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to edge compute devices configured to couple to consumer-managed networks and/or third-party managed networks (e.g., via ethernet, via Wi-Fi, via MoCA, via Bluetooth, via private or public cellular networks, DSL, and so on) or any other suitable network coupling), and thereafter to automatically self-configure according to one or more enterprise security policies defined by an organization.

As a result of this architecture, in one example, a work-from-home employee can be provided, by their organization, with a device as described herein to connect to the employee's home network. Once connected, the device may be assigned a local IP address on the home network and may be configured to automatically communicably couple to a remote service operated by, or under the administration, of the employee's organization. The remote service may be addressed, in some examples, by domain name or by a fixed IP address.

The device may be configured to request, from the remote service, one or more configuration schemas or files which, when received by the device in response to the request, can cause the device to self-configure in accordance with one or more organization security policies. For example, in some embodiments, a device as described herein can be configured to operate as a firewall, a wireless access point (e.g., either or both private cellular or Wi-Fi), and/or a network switch.

In these examples, self-configuration of the device by the device can include, without limitation, operations such as: creating a Wi-Fi network having a particular SSID or BSSID or encryption; enabling or disabling particular ethernet ports of the device; creating a virtual private network connection; creating a Layer 2 tunnel; enabling or disabling deep packet inspection; enabling or disabling URL whitelists or blocklists; enabling or disabling MAC address whitelists or blocklists; enabling or disabling DNS filtering; coupling to one or more proxy services; enabling or disabling DHCP; enabling or disabling particular VLANs; enabling or disabling packet tagging or classification systems; enabling or disabling one or more policy filters; couple to one or more other Wi-Fi networks; enable or disable one or more network bridge settings; setting one or more QoS settings; setting or changing one or more Wi-Fi channels or protocols; and so on.

As a result of such configuration options, a work-from-home employee can connect a device as described herein to any secure or insecure network, whether managed by the employee (e.g., a home network) or by a third party (e.g., a public Wi-Fi network or cellular network). Thereafter, the work-from-home employee can couple a personal electronic device such as a cellular phone or laptop computer to the device in order to securely connect to organization services and to ensure that any existing malicious implanted software instances operating within the work-from-home employee's network are incapable of interacting with or accessing organization information or services. Such a "device" as described herein may be referred to as an "edge-based enterprise network security device."

In addition, embodiments described herein reference system architectures supporting automatic field configuration of such devices. For example, in many embodiments, a backend system can be instantiated over appropriate cloud architecture to provide private DNS services to devices that couple to an edge device, as described herein. In other cases, a backend system can be configured to regularly push configuration updates to numerous edge devices as described herein such that any change in an organization's policy can be implemented by edge devices associated with that organization rapidly. As a result of these constructions, an organization is not reliant on individual employees to install software or MDM configuration profiles on personal devices, update that software regularly, or perform any other particular IT configuring of personal networks or devices. In this manner, an organization can retain control of it's information security policy implementation regardless whether employees work remote or work from within an organization-managed network.

In further examples, an edge device as described herein can be configured to join a public Wi-Fi network and act as a bridge to connect personal electronic devices thereto. For example, a remote-work employee may bring an edge device as described herein to a café or other public location so as to connect to one or more organization services.

More generally and broadly, as may be known to a person of skill in the art, cyber threats, such as malware or virus infections, are a consistent source of liability for electronic devices and associated networks. Even in highly secured environments, cyber threats may still infiltrate protected systems through a number of vulnerabilities or weak points.

For example, a remote storage device (e.g., a flash drive) may be loaded with malware or other form of cyber threat. If a user inserts the remote storage device into a networked device, the malware or the form of cyber threat may install itself on the networked device and may further infect or exploit other connected devices.

As another example, a remote workstation (e.g., a computer at a work-from-home employee's residence) may be infected with malware or other cyber threats if a user of the workstation is not familiar with enterprise-grade network security practices. If the user of the remote workstation access a private network, the remote workstation introduce a vulnerability to the network and devices connected to it.

An edge-based enterprise network security device, and methods for providing enterprise-grade network security, are described herein. An edge-based enterprise network security device may offer high levels of protection from cyber threats, such as malware, trojans, computer viruses, and so on. To provide such protection, the edge-based enterprise network security device may proactively block communications, as originating from a consumer-managed network, classified as being a potential security risk.

To identify whether communications are a potential security risk, malicious infrastructures may be identified using artificial intelligence (AI) and machine learning (ML) algorithms powered by repositories, such as honeypots, spamtraps, network sensors, Internet research activities, or open and commercial data feeds. Remote storages (e.g., remote storages associated with a remote workstation) may additionally be used to identify malicious infrastructures or instances of software.

Any number of graphical user interfaces (GUIs) may additionally be rendered for a user and/or an administrator of an enterprise network as described herein to control and display information or settings related to configuration and operation of an edge-based enterprise network security device or system. In some implementations, a GUI may be provided on a web-based platform and may be accessible by accessing to a webpage and providing credentials to an input form rendered by the requested webpage, such as a user name and password. Applications, such as smart phone applications, may additionally be provided and may include GUIs designed for mobile use. Any of the GUIs described herein may include a number of control elements, such as buttons, sliders, or text boxes, which may be used to control operations of an edge-based enterprise network security device or an associated method.

Any GUI may include a dashboard with viewable and interactable elements where a user may view navigation statistics and interact with associated devices connected to an edge-based enterprise network security device. Example interactions include establishing blocks (e.g., blocking sites based on IP address, domain name, Uniform Resource Locator (URL), or Uniform Resource Identifier (URI)) or monitoring actions (e.g., monitoring incident responses). The GUI may further indicate established rules and regulations required to access a private network (e.g., a workplace network) and may include current compliance with the established rules and regulations. The rules and regulations may be editable by an administrator and/or by a user of any GUI.

In this manner, risks of security perimeter attacks into enterprise networks through consumer-managed networks may be reduced or eliminated.

An enterprise-grade network security approach may include a number of components or modules. A first module may be a hardware module and may be, for example, an integrated circuit (e.g., a system on a chip (SoC)) comprising a number of hardware components such as processing resources and memory resources and networking resources and so on.

A second module may be software loaded onto the hardware module, which may be instantiated as firmware, kernel, operating-system level, application layer or any other suitable abstraction layer of software. In particular, such software can be instantiated by cooperating of a processing resource and memory resource, such as described above. In particular, a processing resource can be configured to access an executable asset from a memory resource and with the memory resource instantiate the software that, in turn, may be configured to cause the processor and/or other hardware components of the device to perform, coordinate, or otherwise execute one or more operations or tasks.

For example, the software may be used to initialize (e.g., boot or install) the first module and may be used to provide or generate notifications corresponding to operations of the hardware module.

A third module may be an application associated with the enterprise-grade network security system. An application (e.g., a web-based or smart phone-based application) may be used as a dashboard and may be used to monitor or control conditions of an enterprise-grade network security system. The application may be associated with one or more GUIs, as described herein. A fourth module may be a strategic intelligence platform and/or a secured Domain Name System (DNS) server. The fourth module may monitor new or potential cyber threats (e.g., through AI and ML) and may communicate with the first, second, and/or third modules to block any cyber threats.

These and other embodiments are described below with reference to FIGS. 1-9. However, those skilled in the art will readily appreciate that the detailed description given herein with respect to these figures is for explanatory purposes only and should not be construed as limiting.

FIG. 1 depicts an example remote access system 100 including an edge-based enterprise network security device 104, a number of user devices 102, a router 106, an authenticator 110, and a number of client services 112. Though the edge-based enterprise network security device 104 and the router 106 are depicted as two separate devices, in some implementations, the edge-based enterprise network security device 104 and the router 106 may be provided as a single device. In many constructions, the router 106 may be a consumer grade all-in-one device including firewall, modem, access point, and/or switching functionality. In other cases, the router 106 may be a fiber or COAX modem with a single WAN output port. In other cases, the router 106 may be another appliance configured to communicably couple one or more devices to a network, which may include the Internet.

The edge-based enterprise network security device 104 may be implemented as a small form factor electronic device, such as a portable or semi-portable electronic device. The edge-based enterprise network security device 104 can include a housing formed of any suitable material or combination of materials (e.g., plastic, or other RF-transparent material; in other cases, antenna may be external and the housing may be formed from metal).

The housing of the edge-based enterprise network security device 104 can enclose and support one or more processing resources, one or more memory resources, and one or more communication subsystems. In one example, a communication subsystem may implement the ethernet protocol. Another example communication subsystem may be a Wi-Fi access point. In yet other cases, a communication subsystem can include a cellular modem, a noncellular model, a DSL modem, or any other suitable networking device or combination of devices. More generally, the communication subsystem(s) of an edge-based enterprise network security device as described herein can be any suitable apparatus configured to network connectivity, including network interface cards and wireless access points. As such, in many constructions, a communication subsystem as described herein can include one or more ports (e.g., RJ45) and/or one or more antennas or antenna arrays).

In some cases, the edge-based enterprise network security device 104 may also include an on-board power source such as a battery bank or photovoltaic cell. In some cases, the edge-based enterprise network security device 104 may include multiple communication subsystems, which may be configured to connection bonding, failover support, or for another purpose.

The edge-based enterprise network security device 104 can leverage the processing resources, the memory resources, and the communication subsystem(s) to perform one or more operations as described herein, such as the self-configuration operations described herein. In such examples, the edge-based enterprise network security device 104 (which may more generally be referred to as a "portable electronic device") can be configured to operate the processing resource to access an executable asset from the memory resource in order to instantiate an instance of software which may be referred to as an edge application.

The edge application can be configured to communicably couple to one or more remote server applications, which may be referred to herein as one or more instances of a "backend application" or a "supporting cloud architecture." As with the edge application, a backend application can be an instance of software instantiated over physical resources (or, in some cases, virtual resources) such as a physical server or other cloud or network-based server architecture. In some cases, such a device may be referred to as a host server. The host server can likewise include a processing resource or processing allocation that can cooperate with a memory resource or allocation (e.g., load one or more executable assets from a non-transient and/or durable portion of the memory resource into a working memory portion of the memory resource) of the host server to instantiate the backend application.

The backend application and the edge application can be configured for any suitable communication over any suitable communication protocol. In many cases, the edge application can be configured to automatically communicate with the backend application by accessing a particular hostname or static IP address. In other cases, the edge application can be configured to access a first service, such as a DNS service, in order to determine an address with which to access an instance of the backend application. A person of skill in the art may appreciate that multiple techniques can be used, in series, in sequence, in parallel, or in place of one another.

In some cases, the edge application can automatically submit a request to the backend application to retrieve configuration information therefrom. For example, the edge application can be preconfigured with an identifier or certificate associated to a particular organization or configuration. For example, in some constructions, the edge-based enterprise network security device 104 can include an immutable memory location that stores an immutable certificate. In other cases, the edge-based enterprise network security device 104 can be configured to output a rolling code or other cryptographically protected unique information.

The edge application can be configured to transmit such an identifier, code, certificate, cryptographic identifier, user credential, organization credential, JSON Web Token (JWT) and so on to the backend application in any suitable form, format, or request set. In response to the request, the backend application can identify a particular configuration file, configuration schema, or sets thereof to transmit to the edge application (more generally "configuration information"). The backend application can suitably package (e.g., compress and/or encrypt, in some examples) the configuration information and submit the package in a response to the edge application.

The edge application can unpackage a payload of the response received from the backend application, decrypt or otherwise manipulate as necessary, and begin self-configuring according to the configuration information.

For example, the configuration information can include certain firewall rules, certain ports to forward, certain Wi-Fi network information, and so on. In such examples. the edge application can cause the edge-based enterprise network security device 104 to configure itself to provide such services, as specified in the configuration information. For example, in some cases, the configuration information may define that a Wi-Fi network should not be created; in these examples, the edge-based enterprise network security device 104 may disable an access point feature thereof. In other cases the configuration information can specify that a particular remote VPN service should be used by the edge-based enterprise network security device 104 to access organization services. In such configurations, the edge-based enterprise network security device 104 can be configured to automatically connect to the specified VPN service on boot; if the VPN service cannot be reached, in some examples, the edge-based enterprise network security device 104 may block all requests for access.

Example information that can be included in configuration information include, but is not limited to: open ports; closed ports; URL blocklists; URL whitelists; VPN services; proxy services; deep packet inspection services; Wi-Fi protocol; Wi-Fi network name (e.g., SSID); whether to broadcast an SSID or not; Wi-Fi channel sets; access point transmit power; client device blocklists; client device whitelists; client device type blocklists or whitelists; quality of service schedules; access point schedules; cellular modem schedules; bandwidth limitations; and so on. A person of skill in the art will readily recognize that the foregoing listing is not exhaustive.

Once configured according to configuration information, client devices that communicably couple to the edge-based enterprise network security device 104 can be protected according to a particular organization's policies.

Further, once configured according to configuration information received from a backend application instance (which may be updated from time to time or on a schedule), the edge-based enterprise network security device 104 can be configured to transmit telemetry information, NetFlow information, or other suitable information, to an instance of the backend application. The backend application can consume such information from one or more edge-based enterprise network security devices associated with a particular organization's distributed corporate/enterprise network in order to inform one or more decisions relating to the same.

The edge-based enterprise network security device 104 can further include in some examples a display configured to render a graphical user interface or other information that may be leveraged by a user to configure the device, to provide information to the edge-based enterprise network security device 104 (e.g., user credentials, and so on), or to display information to the user. For example, once a edge-based enterprise network security device self-self-configures as described herein network information and/or VPN connection status may be displayed on the display of the edge-based enterprise network security device 104.

More generally and broadly, a user may interact with any number of user devices 102 (more generally, "client devices"). Examples of user devices 102 include a mobile phone 102a, a laptop computer 102b, and a desktop computer 102c. The user devices 102 may, in some cases, be located within a home working environment (e.g., a user's home) or may otherwise be located remote from a company or firm. Though three types of user devices 102 are depicted in FIG. 1, it is appreciated that any kind of user device capable of accessing a network may be used.

One or more of the user devices 102 may connect to a network (e.g., the Internet 108) via a router 106. The router 106 may be any type of router and may, in some cases, be located within a user's home. An edge-based enterprise network security device 104 may additionally be provided and may be located within the user's home or other remote working environment. The edge-based enterprise network security device 104 may be a system on chip (SoC) device, may have low energy consumption, and may be fanless, though, in some implementations, the edge-based enterprise network security device 104 may comprise one or more fans.

The edge-based enterprise network security device 104 may apply inline and/or reverse proxy filters on network communications coming from one or more of the user devices 102 (e.g., via a Local Area Network (LAN)). The edge-based enterprise network security device 104 may isolate a user's network (e.g., LAN isolation) to provide protection from cyber threats to all devices 102 communicatively coupled to the edge-based enterprise network security device 104.

In some implementations, the edge-based enterprise network security device 104 may additionally comprise a network cable (e.g., an RJ45 cable), a power cable (e.g., a cable configured to couple with a power outlet), and instructions for installing the edge-based enterprise network security device 104 within a consumer-managed network.

As described above, the edge-based enterprise network security device 104 may be provided with a user's consumer-managed network (e.g., a WiFi network). In some implementations, the edge-based enterprise network security device 104 may be provided with other networks, such as a 5G communication network or other broadband cellular networks.

An application, such as a smart phone application, may be used to assist with on-site install of the edge-based enterprise network security device 104 within the user's consumer-managed network. Through the use of the application, instructions may be provided to a user and may instruct the user how to install and initialize the edge-based enterprise network security device 104. The smart phone application may provide any number of functionalities, including camera functionality for scanning a Quick Response (QR) code.

In some cases, the application may not find the edge-based enterprise network security device 104 on the user's consumer-managed network and may provide instructions for performing a factory reset. In some cases, the router 106 may communicate directly with the application to provide network functionality before the initialization of the edge-based enterprise network security device 104.

Once the edge-based enterprise network security device 104 is installed, the edge-based enterprise network security device 104 may communicate, via a network such as the Internet 108, with a remote authenticator 110. The authenticator 110 may communicate with the edge-based enterprise network security device 104 through encrypted network channels and may exchange keys related to the recognition of networked objects. The authenticator 110 may communicate with the edge-based enterprise network security device 104 at regular intervals in order to evaluate the behavior of each individual user device 102, access one or more client services 112, terminate and/or limit suspicious work sessions (e.g., suspicious work sessions arising from the user devices 102), and so on.

In order to determine whether a particular work session is suspicious, AI or ML analyses may incorporate: communication source Internet Protocol (IP) addresses (via external Network Address Translation (NAT)), fingerprints of devices connected to the edge-based enterprise network security device 104 that require access to one or more client services 112, data logs logging statuses/recent actions performed by devices connected to the edge-based enterprise network security devices 104, connection time to one or more client services 112, the type of client service 112 being accessed, volumetric anomalies on passing traffic, protocol anomalies on passing traffic, and so on.

The client services 112 may reference multiple client services 112a-112d. Each client service 112a-112d may be associated with a particular company and may be, for example, a digital environment controlled by the particular company. For example, a client service 112a may be a service controlled by an employer of a user in possession of the edge-based enterprise network security device 104.

The authenticator 110 may establish permissions with respect to the edge-based enterprise network security device 104, so as to control which client services 112a-112d are accessible by the user devices 102. For example, a client may identify users (e.g., via an identification of the edge-based enterprise network security device 104) to access a client service associated with the client.

Figure 2:
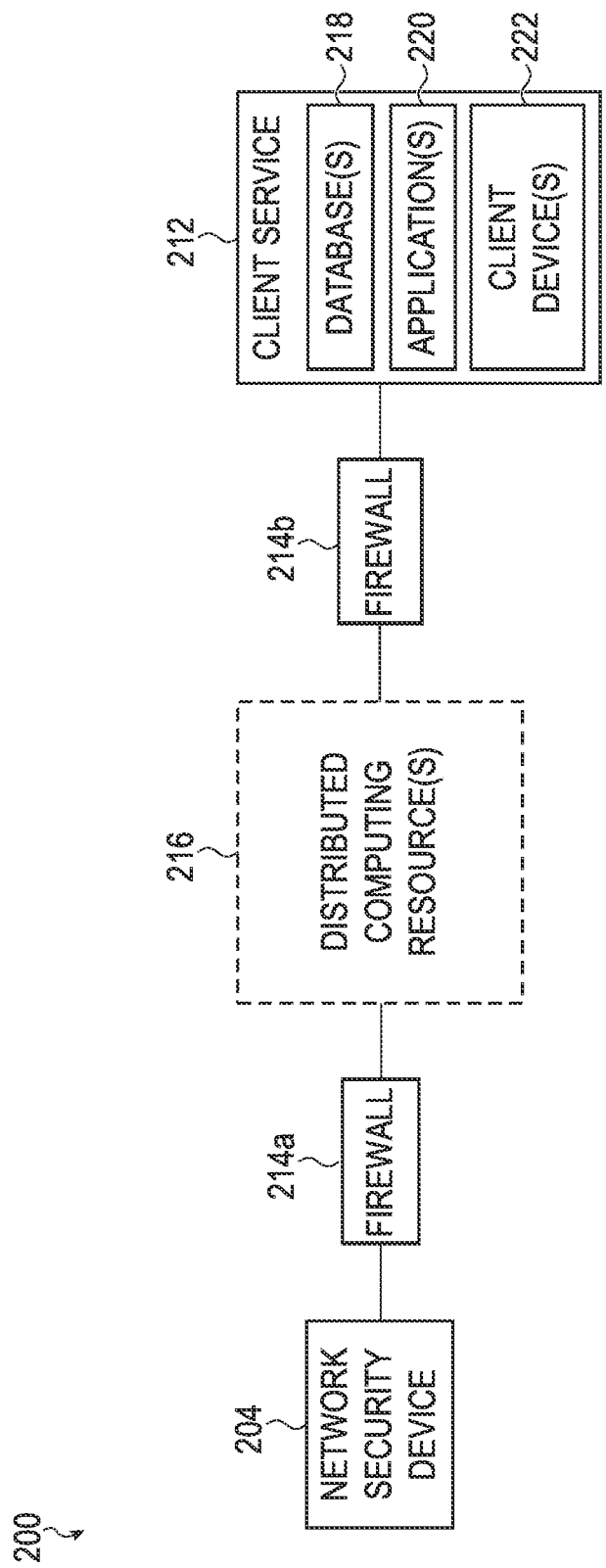
FIG. 2 depicts an example enterprise-grade network security system using one or more distributed computing resources, as described herein.

FIG. 2 depicts an example enterprise-grade network security system 200 incorporating a number of distributed computing resources 216. The distributed computing resources 216 may include a number of servers, DNS servers, and/or strategic intelligence platforms in control of an operator of the enterprise-grade network security system 200. The distributed computing resources 216 may refer to cloud computing arrangements and may scale based on necessary processing and/or computing requirements of the enterprise-grade network security system 200. The distributed computing resources 216 may be scalable. Either public cloud services or private cloud services may be used.

An edge-based enterprise network security device may access a client service 212 through the distributed computing resources 216 (e.g., to identify potential cyber threats) through the use of a network, such as a Virtual Private Network (VPN). One or more firewalls 214a/214b may be utilized to monitor incoming and outgoing network traffic.

The client service 212 may include one or more databases 218, one or more applications 220, and one or more client devices 222. The client service may be a company information technology (IT) infrastructure and may store company data and/or otherwise be a controlled network of company resources.

Figure 3:
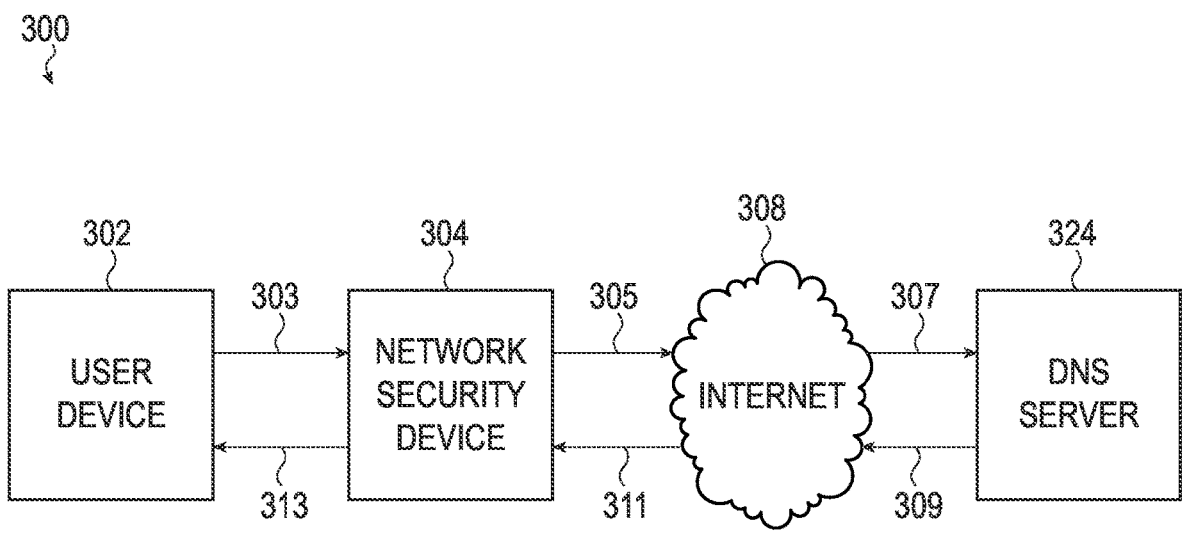
FIG. 3 depicts an example domain resolution system utilizing a remote Domain Name System (DNS) server, as described herein.

FIG. 3 depicts an example domain resolution system 300 utilizing a DNS server 324. The DNS server 324 may be a private DNS instance unique to a particular organization or tenant of a system as described herein. In this manner, organization privacy in NetFlow information may be maintained.

The DNS server 324 may be one or more recursive DNS servers provided in the distributed computing resources 216 depicted in FIG. 2. The domain resolution system 300 may prevent the resolution of domain names classified as suspicious or hostile (e.g., cyber threats) through the use of the DNS server 324. The DNS server 324 may use AI and ML algorithms to classify, categorize, and/or observe domain names over time to identify a risk level (e.g., by identifying suspicious registration circumstances and timing). In some cases, metadata from different organization's DNS service instances can be aggregated centrally to share security inferences or insights therebetween. For example, if one organization's private DNS instance detects a spike in requests to a particular resource location that AI/ML analysis determines is likely associated with a malware or phishing campaign, the organization's DNS service may proactively block future access to that particular resource location. In addition, the DNS instance may be configured to transmit information to other DNS instances indicating a confidence score that a specified resource location is malicious and should be blocked. Other DNS services may subscribe to such notifications (e.g., either directly or by subscribing to a central service configured to receive and distribute such notifications among multiple DNS services among multiple organizations) and proactively block within their own network access to such flagged resources.

In this manner, and as a result of these operations, multiple different organization's threat intelligence systems can cooperate to proactively vitiate malware or phishing campaigns, without sharing confidential business information or configuration information.

In the domain resolution system 300, a user device 302 may request navigation to a site at operation 303. The request at operation 303 may be received by the edge-based enterprise network security device 304, which may include a resolver and/or static DNS servers. At operation 305, the request to the site may be transmitted, over a network (e.g., the Internet 308) and may be received, as indicated at operation 307, by the DNS server 324. Using AI and ML algorithms, the DNS server 324 may determine whether the requested site is blacklisted (e.g., marked as being a dangerous or potentially dangerous site).

At operation 309, the DNS server 324 may transmit a determination as to whether the requested site is blacklisted. This determination may be transmitted through a network (e.g., the Internet 308) and may be received at the edge-based enterprise network security device at operation 311. If the requested site is blacklisted, the DNS server 324 may transmit the public address of a landing page, which may cause display of an indication that the requested site is dangerous or potentially dangerous on the user device 302 (e.g., at operation 313). The landing page may additionally include information as to why the requested site is blocked (e.g., for reasons related to phishing, malware, scams, command and control, and so on). Alternatively, if the DNS server 324 determines that the requested site is safe, the edge-based enterprise network security device 304 may permit access to the site with respect to the user device 302.

Figure 4:
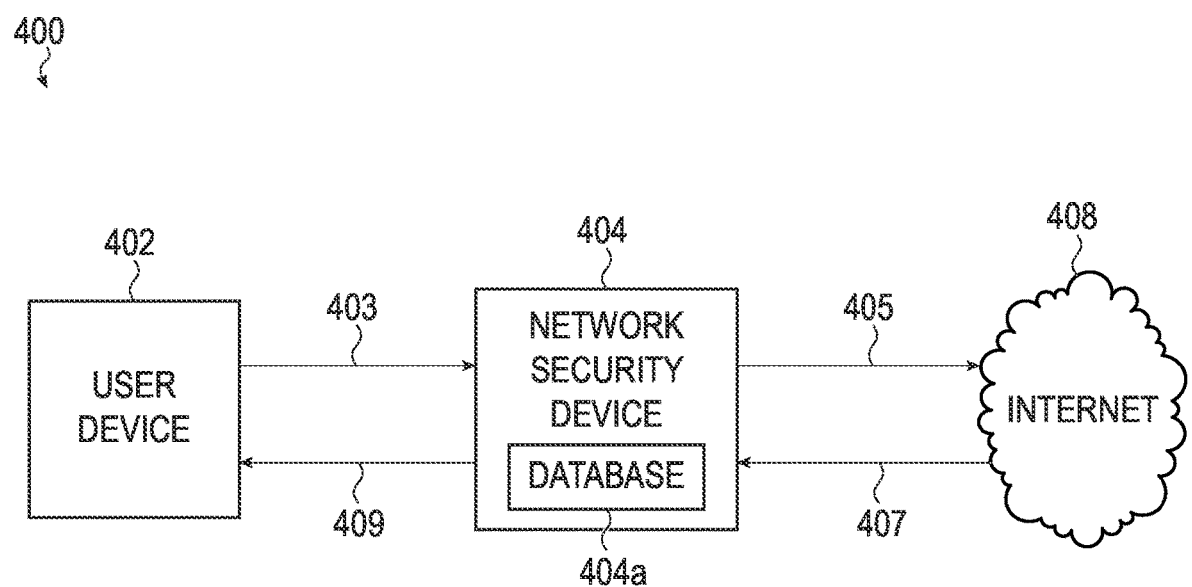
FIG. 4 depicts an example domain resolution system utilizing a local edge-based enterprise network security device, as described herein.

FIG. 4 depicts an example domain resolution system 400 performed using an edge-based enterprise network security device 404 and an associated database 404a. The database 404a may store a list of hostile or potentially hostile resources (e.g., a blacklist) and may be periodically updated through a software agent that communicates with a backend system (e.g., distributed computing resources) to retrieve updates (e.g., through AI or ML processes).

A user device 402 may transmit a request to access a site at operation 403, as received by an edge-based enterprise network security device 404. The edge-based enterprise network security device 404 may compare the request with an associated database 404a to determine whether the request is requesting a hostile or potentially hostile resource (e.g., by querying a blacklist). If the request is not associated with an indicated hostile or potentially hostile resource, the edge-based enterprise network security device 404 may transmit the request to a network (e.g., the Internet 408) at operation 405. At operation 407, the requested site, or resources, may be provided to the edge-based enterprise network security device 404 which may, in turn, provide the site or resources to the user device 402 at operation 409.

If the edge-based enterprise network security device 404 determines that the requested site does reference a hostile or potentially hostile resource (e.g., by querying the database 404a), the edge-based enterprise network security device 404 may transmit a local landing page indicating that the request cannot be fulfilled. The local landing page may further indicate the reason that the request cannot be fulfilled (e.g., phishing, malware, scam, command and control, and so on). The edge-based enterprise network security device 404 may include a Hypertext Transfer Protocol (HTTP) proxy and/or a Hypertext Transfer Protocol Secure (HTTPS) proxy to receive the request from the user device 402.

Figure 5:
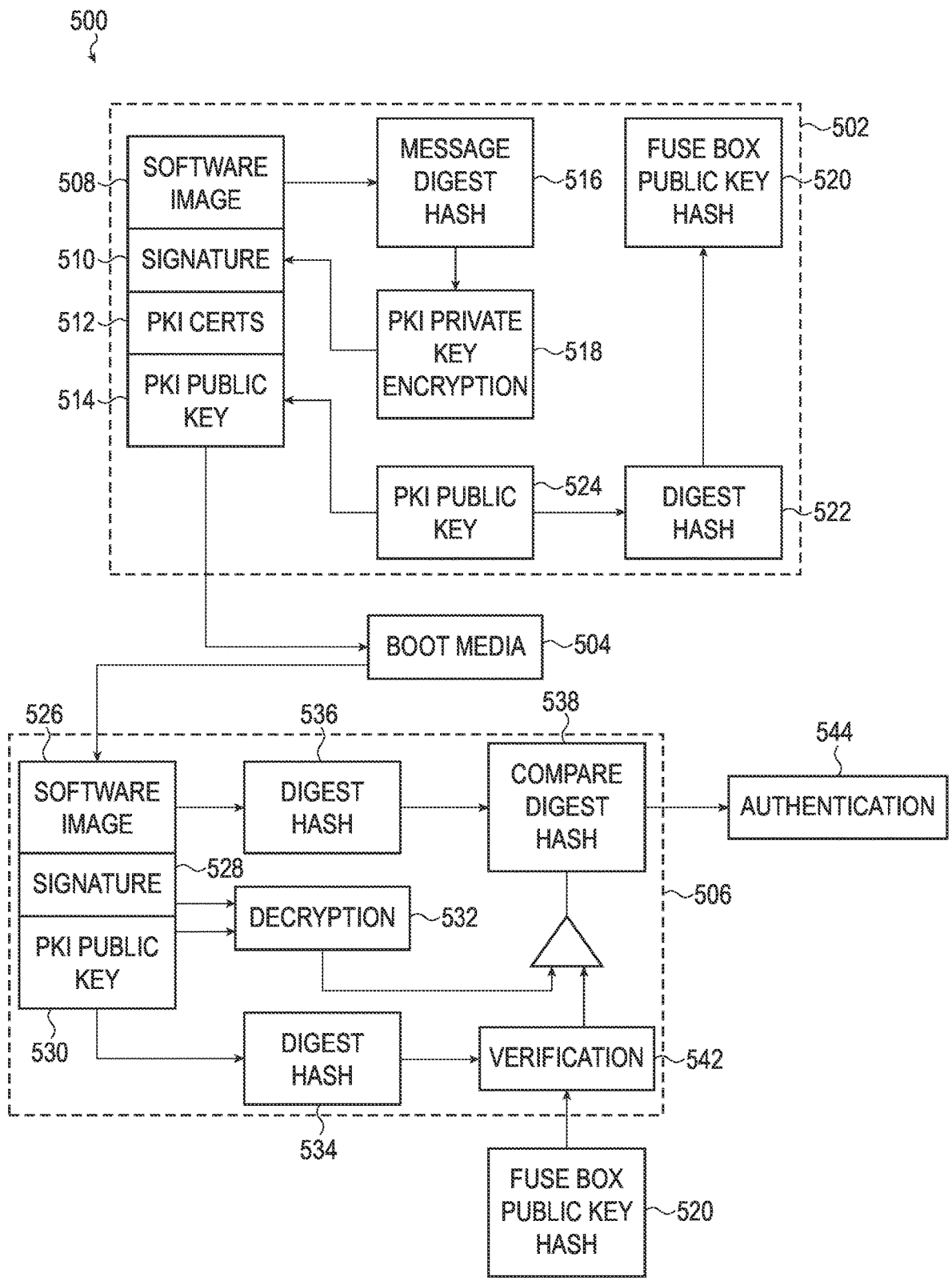
FIG. 5 depicts an example boot chain for a secured boot sequence, as described herein.

FIG. 5 depicts an example secured boot sequence 500. The secured boot sequence 500 may be implemented using High Assurance Boot (e.g., HABv4). The secured boot sequence 500 may comprise a secure environment within an Original Equipment Manufacturer (OEM) device used for code signing 502 and an OEM trusted device boot for authentication 506. A software image 508, signature 510, and PKI public key 514 from the code signing 502 may be stored in a boot media 504 before being read for authentication 506.

During code signing 502, the software image 508 may be provided to a message digest hash 512 (e.g., SHA-256). The message digest hash 516 may be provided to a PKI private key encryption 518 and may result in a signature 510. A PKI public key 524 may be provided as the PKI public key 514 (e.g., the PKI public key loaded on the boot media 504) and may additionally be provided to a digest hash 522 (e.g., SHA-256) and, ultimately, to a fuse box public key hash 520 (e.g., SRK). In other words, the hash of the PKI public key 524 may be stored in a secure part of fusebits, which may not be directly readable. The hash of the PKI public key 524 may ultimately be provided to verification 542 of the authentication 506.

For authentication 506, the software image 526, signature 528, and PKI public key 530 may be obtained from the boot media 504. The software image 526 may be provided to a digest hash 536 (e.g., SHA-256) and may be compared with the output of the decryption 532 of the signature 528 and the verification 542. The PKI public key 530 may be provided to decryption 532 and to the digest hash 534 (e.g., SHA-256). The output of the digest hash 534 may be used for verification 542 with the fuse box public key hash 520. If verification 542 is successful (e.g., if the two hashes coincide), the signature of the binaries may be validated and a boot process may occur. However, if the verification is not successful the boot process may fail and an SDP mode may initiate. Through this process, the secured boot sequence 500 may be ensured with a certified origin and may be intact, as only those in possession of the private keys may generate a valid signature of the binaries and the binaries may not be tampered with as they are signed with a private key.

In some implementations, a watchdog circuit (e.g., an internal watchdog or a dedicated watchdog chip) may be provided as a fail-safe to prevent circuit damage and/or to prevent infinite loops. The bootloader may initiate the watchdog circuit and may keep the watchdog circuit operating. During initial phases of the boot, a kernel may take over operations of keeping the watchdog circuit operational. If the kernel crashes during boot, the watchdog circuit may not longer be powered and, once the watchdog circuit times out, the watchdog circuit may reset the SoC board. Additionally, a boot system may comprise multiple boot partitions. After multiple failed boot attempts, the bootloader may start using previously unused pairs of boot-root partitions as the boot chain.

Figure 6:
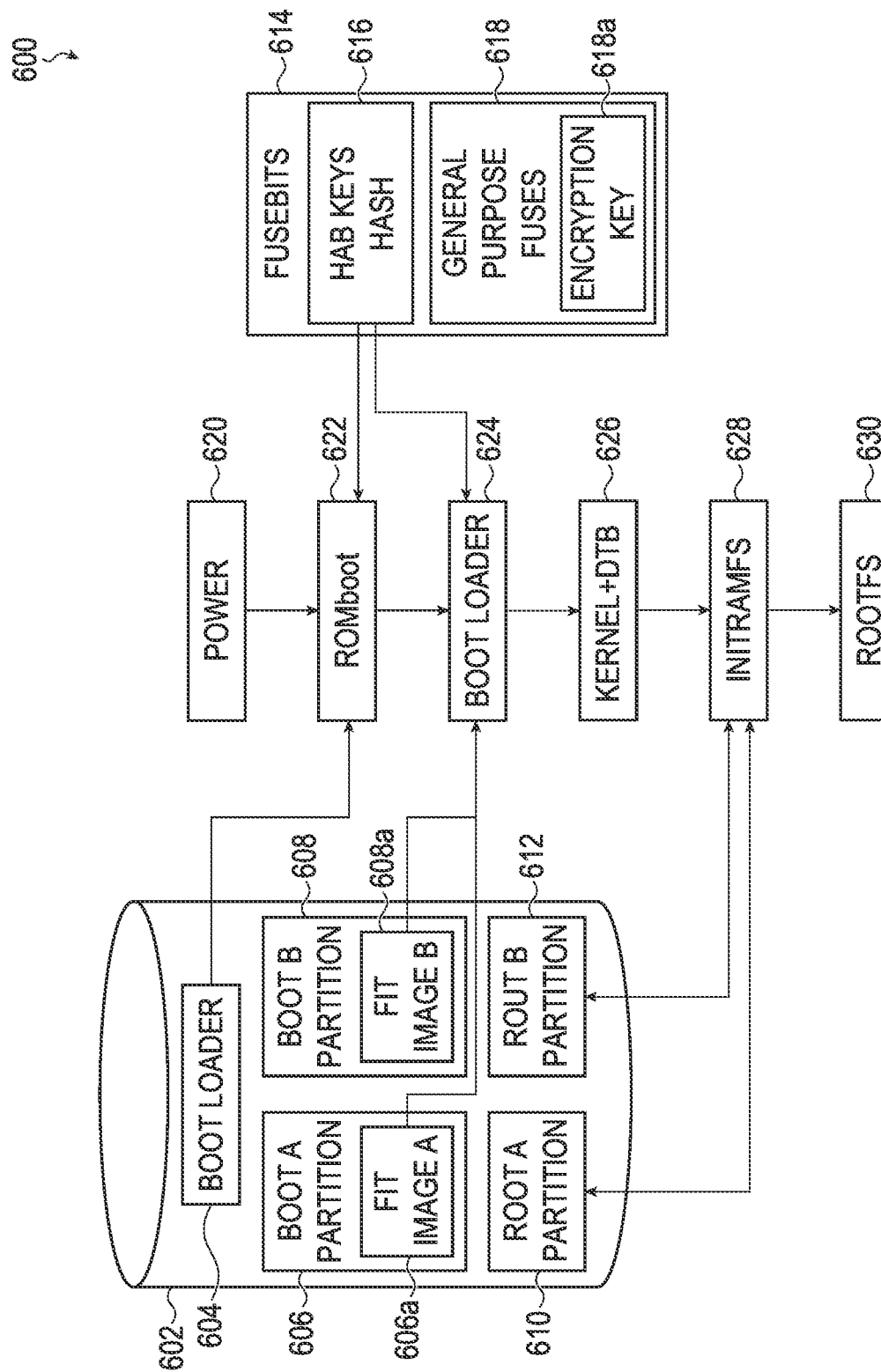
FIG. 6 depicts an example encrypted file system and operations of a secured boot sequence, as described herein.

FIG. 6 depicts an example encrypted file system 600 and operations for an associated bootchain process. A root filesystem 602 may be encrypted using a kernel's dm-crypt module and may be created with a unique bit key (e.g., a 256-bit key). The bit key may be stored in a SoC, as described herein. At boot, initramfs may open the encrypted partition using the encrypted key read by fusebits 614.

A boot using the encrypted file system 600 may begin when power is applied to an SoC at operation 620. At operation 622, a ROMboot may initiate as received from a bootloader 604 within the root filesystem 602. At operation 624, the bootloader signature may be checked with a HAB (e.g., HAB keys hash 616, general purpose fuses 618, and/or encryption key 618a of fusebits 614) and FIT image A 606a and FIT image B 608a may be loaded (e.g., kernel, dtb and initramfs). The FIT image A 606a and FIT image B 608a may be provided, respectively, within boot A partition 606 and boot B partition 608. The boot process may continue through kernel and dtb at operation 626, initramfs at operation 628, and rootfs at operation 630. Root A partition 610 and root B partition 612 may be dm-crypt encrypted and may be provide at the initramfs stage at operation 628. The boot may take place from bootchain A or bootchain B, depending on the active bootchain update paradigm.

Due to the protection and encryption mechanisms implemented in the system, a file system validity check process may be omitted. A factory reset may take place by forcing the SoC into programming mode using an appropriate jumper. In this manner, contents of the root filesystem 602 may be overwritten. A temporary bootloader, properly signed with HAB keys, may be loaded onto a random access memory (RAM) of the SoC and may manage programming operations.

Figure 7:
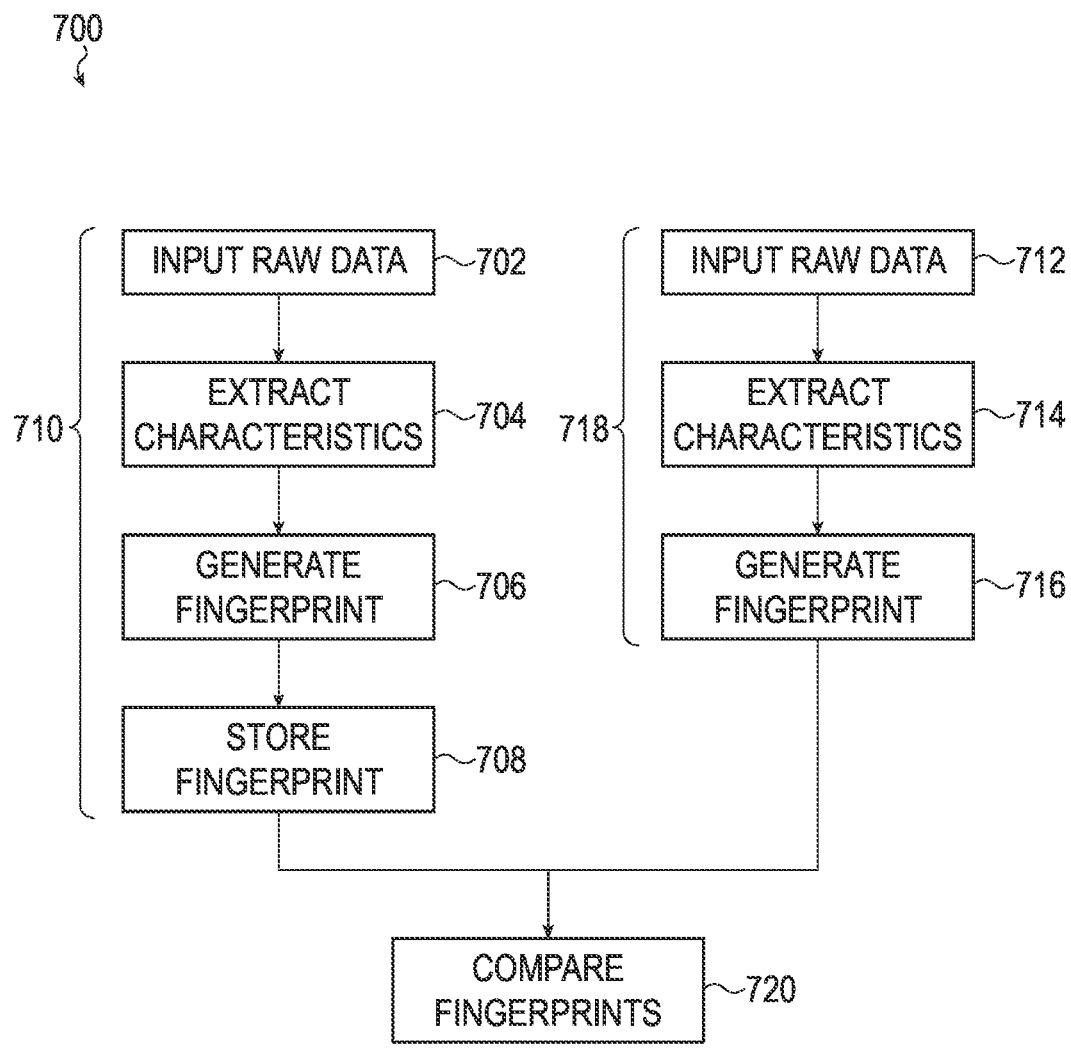
FIG. 7 depicts example device fingerprint creation and verification processes, as described herein.

FIG. 7 depicts an example device fingerprint creation and verification process 700. The device fingerprint creation and verification process 700 may be used to classify device fingerprints that are connected to a Wi-Fi network. Through the device fingerprint creation and verification process 700, each fingerprint of a device may be unique to the device, each fingerprint may be difficult, or impossible, to forge, and the characteristics used in the fingerprinting process may be stable and reproducible.

The fingerprint creation process 710 may create and store fingerprints for devices. The real-time fingerprint creation process 718 may create fingerprints for a user device currently in use. If a fingerprint created in process 718 matches with a previously stored fingerprint in process 710, the device may be verified.

Each fingerprint creation process 710/718 may generally follow the same process of receiving raw data (702/712), extract characteristics from the raw data (704/714), and generating a fingerprint (706/716). During process 710, the fingerprint may be stored at operation 708 to compare against fingerprints created in real-time. By this fingerprint analysis, device identities may be confirmed.

Fingerprints may be categorized using Passive/Active fingerprinting and Static/Dynamic fingerprinting. Categorization may be implemented using TCP/IP networkstack tag and may be analyzed with packet, dataframe, flow, header, and payload. An output fingerprint may be based on three categories, based on ML, such as class, type, and unique. This approach may provide a high level of discovery for devices connected to an edge-based enterprise network security device, as described herein.

Figure 8:
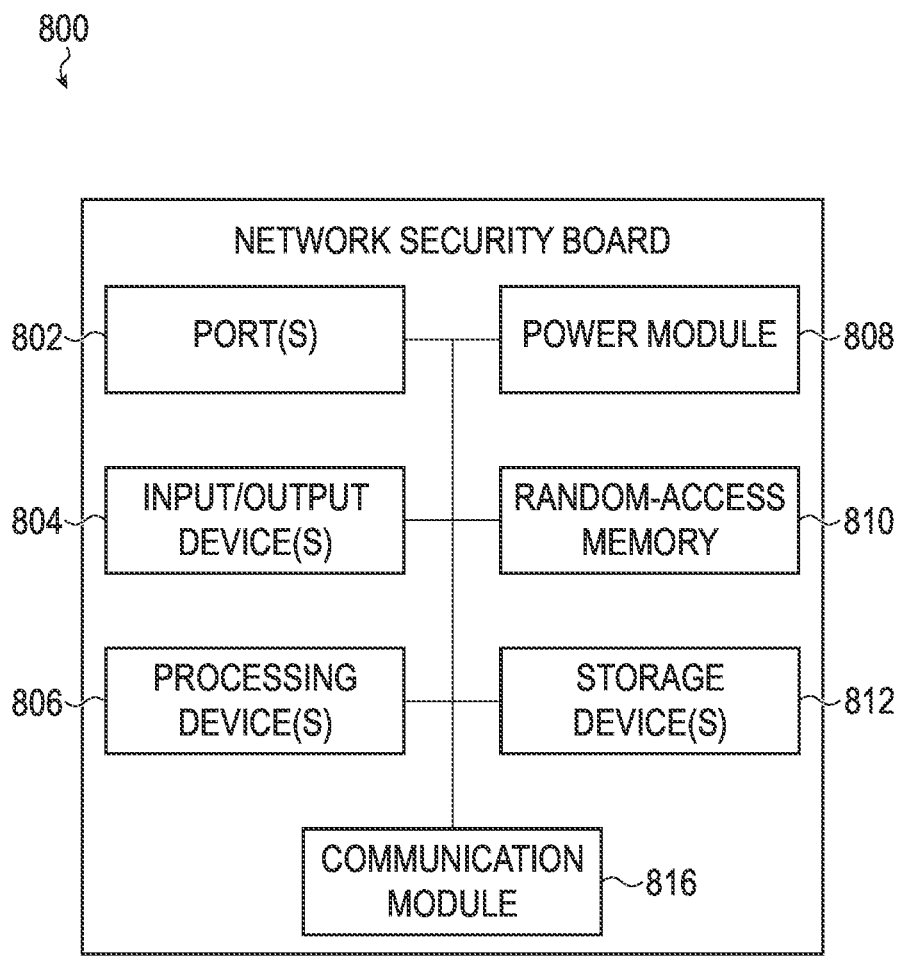
FIG. 8 depicts components of an example enterprise-grade network security board, as described herein.

FIG. 8 depicts components of an example enterprise-grade network security board 800. The enterprise-grade network security board 800 may communicate with a back-end system (e.g., a cloud-based strategic intelligence platform) to identify potential security risks. The enterprise-grade network security board 800 may exchange dynamic block lists and update static lists as a way of identifying the potential security risks. The enterprise-grade network security board 800 may be independently configured based on particular requirements of an employer.

The enterprise-grade network security board may perform the functions of and/or be used as: an automatic Iptables generator; DNS log capture; blocking static list; VPN solutions; apply architectural models of remote access to critical business services; custom operating system distribution and hardening; secure boot; boot control via a watchdog circuit; an encrypted file system; file system validity check; factory reset; automatic Wi-Fi select channel; Wi-Fi with traditional PSK solution and DSK alternative; Wi-Fi scan; device fingerprinting; UPnP initialization board and second channel of initialization; and so on.

The enterprise-grade network security board 800 may include a number of ports 802, such as USB ports and Ethernet ports. The ports 802 may be protected from electromagnetic interference (EMI). A power module 808 may include circuitry, batteries, and/or connectors for providing power (e.g., 5 volts) to the enterprise-grade network security board 800. The input/output devices 804 may include any device for affecting an operation of the enterprise-grade network security board, such as a factory reset button, or for indicating a status of the enterprise-grade network security board 800, such as red-green-blue (RGB) light-emitting diodes (LEDs). A random access memory 810 (e.g., a synchronous dynamic random-access memory (SDRAM)) may be used as temporary memory for performing processing operations.

The processing device(s) 806 may be implemented as any processor capable of processing, receiving, or transmitting data or instructions, whether such data or instructions is in the form of software or firmware or otherwise encoded. For example, the processing device(s) 806 may include a microprocessor, a central processing unit (CPU), an application-specific integrated circuit (ASIC), a digital signal processor (DSP), a controller, or a combination of such devices. As described herein, the term "processing device(s)" is meant to encompass a single processor or processing device, multiple processors, multiple processing devices, or other suitably configured computing element or elements. In some cases, the processing device(s) 806 may provide part or all of the processing system or processor described herein. It should be noted that the components of the enterprise-grade network security board 800 can be controlled by multiple processors. For example, select components of the enterprise-grade network security board 800 may be controlled by a first processor and other components of the enterprise-grade network security board 800 may be controlled by a second processor, where the first and second processors may or may not be in communication with each other.

The storage devices 812 may store instructions executable by the processing device(s) 806 and configured to perform the functions and operations described herein. For example, the storage devices 812 may store, for example, information on malicious or potentially malicious sites. The storage devices 812 may include any type of memory. By way of example only, the storage devices 812 may include Flash memory, removable memory, other types of storage elements, or combinations of such memory types.

The communication module 816 may be configured to transmit and/or receive signals or electrical communications from an external or separate device. The communication module 816 may be configured to couple to an external device via a cable, adaptor, or other type of electrical connector. In some embodiments, the communication module 816 may be used to couple the enterprise-grade network security board 800, or components thereof, to an external computing device, such as a mobile device or a desktop computing device, over a wired or wireless network (e.g., the Internet).

Certain functionalities of an enterprise-grade network security board (e.g., enterprise-grade network security board 800) will now be described.

As described above, an enterprise-grade network security board may be used as an automatic Iptables generator. The automatic generation of Iptables rules within the enterprise-grade network security board may be used to keep the current configurations of the device aligned with company security standards and in-line with the latest security updates (e.g., from distributed computing resources). The operations on the Iptables rules regarding routing, forwarding as well as the blocking settings of particular traffic flows may be transparently provided to a user (e.g., via an associated GUI).

Software stored on an enterprise-grade network security board may communicate at regular intervals with a backend system, to check for any security or configuration updates. Security updates may be dictated and controlled by a dedicated analysis and research team and/or AI or ML algorithms. If the software identifies the presence of security updates, a file may be downloaded that describes what changes to make to the local Iptables file. The file may be used to prevent any communications with command and control centers, malware drop points, resources classified as phishing and/or scam, and so on. The configuration updates may be dictated by a company or client, through an associated application. The configuration updates may be custom-created for a particular company. The enterprise-grade network security board may check for any configuration changes and may download an additional file capable of describing the changes.

The enterprise-grade network security board may additionally be used for DNS log capture functionality. The application of blocking rules on the DNS protocol may be used to impose specific browsing filters on each device protected by the enterprise-grade network security board. Through these filters, risks from hostile resources may be mitigated or eliminated. The application of these blocks may take place both in aligning each individual board with the latest security updates and to impose specific company restrictions on employee navigation.

The architectural model through which the DNS filters may be applied on the enterprise-grade network security board may be a hybrid model and may be based on the local dnsmasq daemon. The security type blocks may be applied by verifying that each single board uses recursive DNS, maintained on data centers distributed in distributed resources (e.g., a cloud). These cloud DNS servers may be automatically updated at periodic intervals for the application of the latest block lists released by a backend. The enterprise-grade network security board may be able to verify that the resolution of domain names takes place through a pair of DNS servers certified by the backend.

The enterprise-grade network security board may additionally be used for blocking static lists. Blocking static lists may represent a part of the protection provided by an enterprise-grade network security board. These blocking static lists may be acquired from different sources, including open source sources, semi-open sources, closed or commercial sources, and internal research sources. Entries within an automatic Iptables generator and a DNS log capture may be used for blocking static lists.

An enterprise-grade network security board may support for VPN technologies to allow for remote and secure access of company resources. The enterprise-grade network security board may perform the automatic setup of a specified VPN tunnel after having retrieved the necessary information from a backend. Any changes or modifications to this configuration, including the decommissioning of the VPN tunnel and/or the revocation of the certificates used for access, may be monitored.

An operating system, such as LINUX, may be provided on the enterprise-grade network security board. Distributions of the operating system may be installed from a "bottom-up" approach and individual components (e.g., binaries or libraries) may be selected for the operating system installation. The system, therefore, may be specifically made without unwanted or superfluous packages.

In some implementations, Wi-Fi channels may be automatically selected with respect to the enterprise-grade network security board. The algorithm used for the automatic channel selection functionality may scan available channels to determine the uptime, the time in which the channel is busy, the transmission time and the noise, and so on. Starting from these parameters, an algorithm may determines an interference coefficient for each channel, defined as the percentage of occupation of the amplified channel for the rescaled background noise compared to the lowest detected in the whole observed spectrum. The channel with the lowest interference coefficient may be selected and used for communication.

For the security of the Wi-Fi network, IEEE 802.11i Wi-Fi Protected Access II (WPA2) mode may be enabled, while WPA and WEP standards may be disabled.

The use of specific messages, may capture the SSIDs present on all channels. Together with the SSIDs, an application programming interface (API) may return additional information about the networks identified during the scan, such as the MAC layer address of the station and the strength of the received signal.

Secure Simple Pairing (SSP) may be used to pair an edge-based enterprise network security device with local devices. SSP may provide a number of association models that are flexible in terms of device input/output capability. SSP may additionally provide security through the addition of ECDH public key cryptography for protection against passive eavesdropping and man-in-the-middle attacks (MITM) during pairing. Associative models offered in SSP may include numeric comparison, passkey entry, Out of Band (OOB), and so on.

In some implementations, BLUETOOTH services may be used to provide an authenticated link key, an unauthenticated link key, or no security at all.

Figure 9:
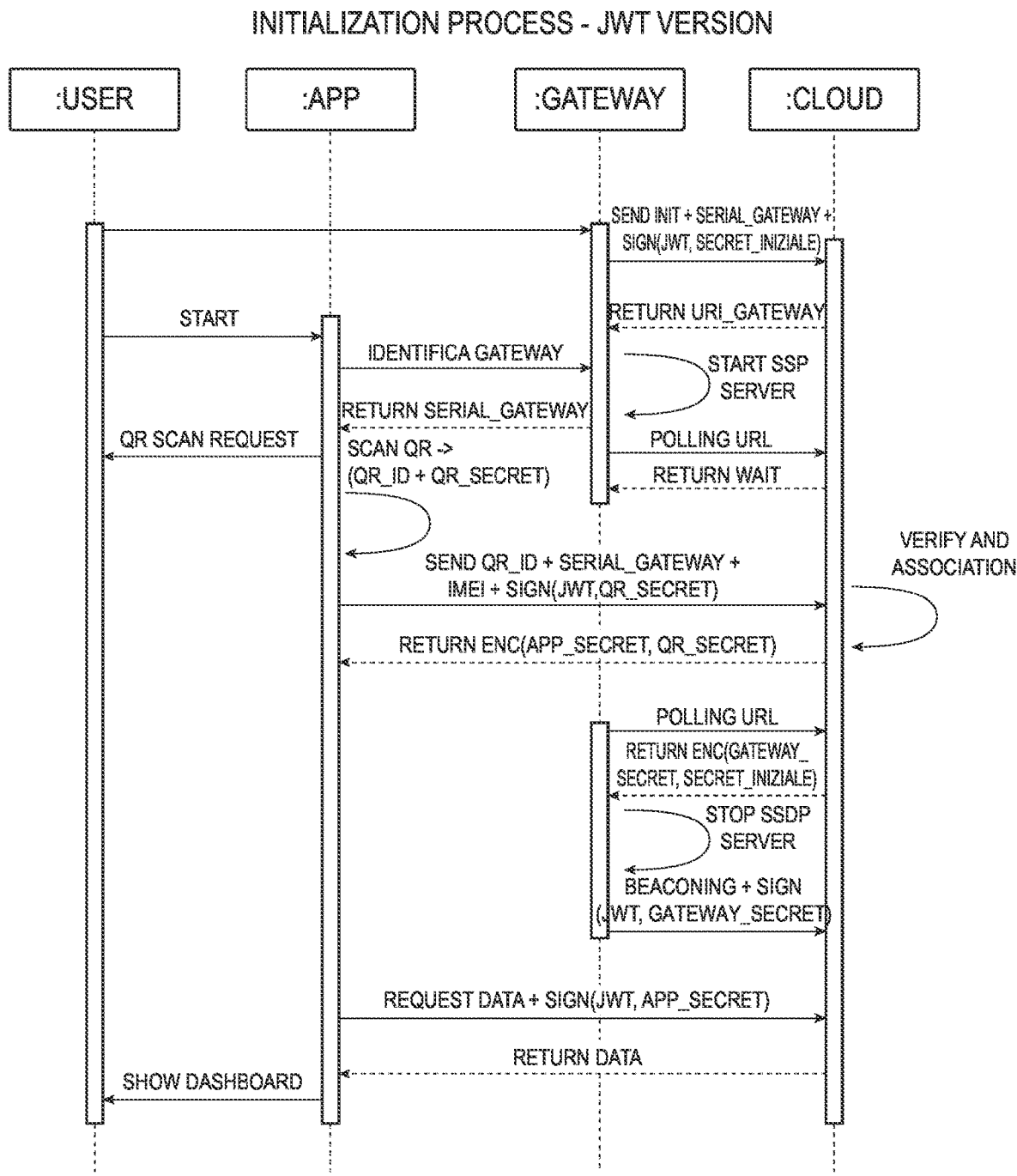
FIG. 9 depicts an example initialization process of an edge-based enterprise network security device, as described herein.

FIG. 9 depicts an example initialization process for an edge-based enterprise network security device, such as described herein.

A native application may be available on, for example, smart phone marketplaces. The native application may be used to install and/or monitor software on an enterprise-grade network security board. Additionally, the native application may display any blocked navigation and/or abnormal behavior derived internet browsing out of policy. The native application may perform the following functions: first initialization of the enterprise-grade network security board; notification of security events and/or company policy; visibility of the SSID of the enterprise-grade network security board and the PSK or DSK to be used at each access; factory reset; chatbot for first level interaction; history of alert notifications and anomalies; use history; and so on.

As described above, a dashboard may be provided as a control center for security standards. The dashboard may enable remote working and security rule management, displaying aggregate data collected from user devices connected to an edge-based enterprise network security device. The dashboard may display statistics and figures associated with past, present, or future security instances. The dashboard may provide the following capabilities: top events graph; geo distribution; active work-from-home employees; total access domain; events blocked by rules/policy; security events; summary by category; visibility; single device overview; device events IP; device events domain; linked devices; event list IP; event list domain; and so on. The dashboard may be fully integrated with single sign-on systems. A REST API may additionally be provided.

The Strategic Intelligence and Investigation platform is a web platform designed to be used by personnel operating in SOC (Security Operation Center), CERT (Computer Emergency Response Team), CSIRT (Computer Security Incident Response Team) and/or groups engaged in cyber threat analysis and analysis. The platform, developed and maintained in house, uses proprietary code and is constantly evolving. Analysis and correlation processes designed for predictive and preventive defense against computer threats e-crime/APT (Advanced Persistent Threat), allow to obtain detailed and timely context information about malicious campaigns aimed at digital espionage, sabotage of critical infrastructure and/or general dissemination of malicious code.

A strategic intelligence platform (e.g., as provided on distributed computing resources) may integrate automated correlation systems (e.g., ML and AI) and information from manual analysis and third-party sources. The strategic intelligence platform may be used to access structured reports on APT/Crime threats; access compromise indicators via dedicated feeds; access to documents and information found and collected in sector channels and searches in the dark web; and so on. The strategic intelligence platform may acquires data from a number of locations, including: virtual identities (e.g., user names); digital forensics incident response; reverse engineering; networksensors; malware traps, such as spamtraps, honeynets and hunting frameworks; closed information exchange; open source intelligence; third-party feeds; and so on.

A device may include features aimed at securing remote work by checking and detecting potential attacks on the IEEE 802.11 Wi-Fi transmission standard. These features, integrated by controlling the data traffic of the Wi-Fi network, or other network, to which the device is connected, may address potential problems such as Rouge Access Points, Man-in-the-Middle attacks, Channel Switching, Address Resolution Protocol (ARP) Poisoning, Malware Beacons, and so on. In this manner, a security of a Wi-Fi network may be increased and may, in some cases, have security comparable to, or better than, a wired network.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

In addition, it is understood that organizations and/or entities responsible for the access, aggregation, validation, analysis, disclosure, transfer, storage, or other use of private data such as described herein will preferably comply with published and industry-established privacy, data, and enterprise-grade network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A edge-based enterprise network security device for installation within a private computer network managed by a remote employee of an organization, the edge-based enterprise network security device comprising:
   a housing enclosing:
      a wired communication subsystem;
      a wireless communication-subsystem;
      a memory resource storing an executable asset; and
      a processing resource operably coupled to the memory resource and configured to load from the memory resource the executable asset to instantiate an instance of an edge application, the edge application configured to:
         access from the memory a credential associated with at least one of the organization or the employee;
         access from the memory an address pointing to a backend application instance associated with the organization;
         obtain an internet protocol (IP) address from the private computer network:
         in response to obtaining the IP address, automatically establish a virtual private network connection to the organization using the credential;
         submit, via the wired communication subsystem over the virtual private network connection, a request for configuration information to the backend application at the address;
         receive, via the wired communication subsystem over the virtual private network, from the backend application in response to the request, a response comprising the configuration information;
         automatically configure at least one operational parameter of the wireless communication-subsystem based on the configuration information, the operational parameter comprising at least one of:
            a Wi-Fi network protocol;
            at least one port to open; and
            at least one port to close;
         automatically communicably couple to a private domain name service (DNS) specified in the configuration information;
         bond the wired communication subsystem to the wireless communication-subsystem such that traffic generated in respect of operation of the wireless communication-subsystem is directed through the wired communication subsystem and the virtual private network; and
         enable the wireless communication-subsystem.

2. The edge-based enterprise network security device of claim 1, wherein the wireless communication-system comprises a Wi-Fi access point for a Wi-Fi network.

3. The edge-based enterprise network security device of claim 2, wherein the at least one operational parameter comprises a name for the Wi-Fi network.

4. The edge-based enterprise network security device of claim 2, wherein the at least one operational parameter comprises an encryption protocol for the Wi-Fi network.

5. The edge-based enterprise network security device of claim 2, wherein the at least one operational parameter defines a set of ports to remain open and a set of ports to close.

6. The edge-based enterprise network security device of claim 1, comprising a battery within the housing.

7. The edge-based enterprise network security device of claim 1, comprising a display configured to display a connection status of the virtual private network.

8. The edge-based enterprise network security device of claim 1, wherein the wireless communication-subsystem is configured to generate a private cellular network.

9. An electronic device for installation within a private computer network managed by a remote employee of an organization, the electronic device comprising:
- a wireless communication subsystem;
- a network interface card;
- a memory resource; and
- a processing resource operably coupled to the memory resource and cooperate with the memory resource to instantiate an instance of an edge application, the edge application configured to:
  - advertise a first wireless network with the wireless communication subsystem;
  - communicably couple to a first client device via the first wireless network;
  - serve a web page to the first client device via the first wireless network;
  - receive from the first client device a user credential as input to the web page;
  - access from the memory an address pointing to a backend application instance associated with the organization;
  - submit, via the network interface card over the private computer network, a request to the backend application via the address, the request comprising the user credential;
  - receive, via the network interface card over the private computer network, from the backend application in response to the request, a response comprising configuration information;
  - automatically configure an operational parameter of a second wireless network advertised by the wireless communication subsystem based on the configuration information, the operational parameter comprising at least one of:
    - a Wi-Fi network protocol;
    - at least one port to open; and
    - at least one port to close;
  - automatically communicably couple to a private domain name service of the organization based on the configuration information;
  - automatically communicably couple to a virtual private network of the organization based on the configuration information such that traffic from a second client device communicably coupled to the second wireless network is directed through the virtual private network over the private computer network; and
  - enable the second wireless network.

10. The electronic device of claim 9, wherein upon configuring the second wireless network, the edge application is configured to disable the first wireless network.

11. The electronic device of claim 9, wherein the operational parameter comprises a network name.

12. The electronic device of claim 9, wherein the operational parameter comprises a blocklist.

13. An electronic device for coupling to a private computer network managed by a remote employee of an organization, the electronic device comprising:
- a communication subsystem;
- a memory resource; and
- a processing resource operably coupled to the memory resource and cooperate with the memory resource to instantiate an instance of an edge application, the edge application configured to:
  - access from the memory an organization credential and an address pointing to a backend application instance associated with the organization;
  - submit, via the communication subsystem over the private computer network, a request for configuration information to the backend application via the address;
  - receive, via the communication subsystem over the private computer network, from the backend application in response to the request, a response comprising the configuration information;
  - automatically configure an operational parameter the communication subsystem based on the configuration information to define a secure network, the operational parameter comprising at least one of:
    - a Wi-Fi network protocol;
    - at least one port to open; and
    - at least one port to close;
  - automatically couple to a private domain name system associated with the organization and specified in the configuration information, directing all domain name requests in respect of the secure network to the private domain name system; and
  - automatically communicably couple to a virtual private network of the organization based on the organization credential and the configuration information such that all traffic from a client device communicably coupled to the secure network defined by the communication subsystem is directed through the virtual private network over the private computer network.

14. The electronic device of claim 13, wherein the secure network is a wireless network.

15. The electronic device of claim 14, wherein the operational parameter comprises an encryption standard of the wireless network.

16. The electronic device of claim 12, wherein the edge application is configured to automatically communicably couple to a private domain name service of the organization based on the configuration information.

17. The electronic device of claim 12, wherein the address comprises a uniform resource location.

* * * * *